(12) United States Patent
Gillick et al.

(10) Patent No.: US 6,350,492 B1
(45) Date of Patent: *Feb. 26, 2002

(54) COATED MULTI-FILAMENT REINFORCING CARBON YARN

(75) Inventors: James Gregory Gillick, Akron; Cecil Bennett, Jr., Cuyahoga Falls, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,892

(22) Filed: May 12, 2000

Related U.S. Application Data

(62) Division of application No. 08/695,050, filed on Aug. 9, 1996, now Pat. No. 6,077,066.

(51) Int. Cl.[7] ................................................. B05D 3/02
(52) U.S. Cl. ...................................... 427/407.1; 427/412
(58) Field of Search ............................... 427/407.1, 412

(56) References Cited

U.S. PATENT DOCUMENTS

| | | | |
|---|---|---|---|
| 3,689,354 A | 9/1972 | Mamok et al. | 161/92 |
| 4,044,540 A | 8/1977 | Toki et al. | 57/153 |
| 4,438,178 A | 3/1984 | Powers | 428/289 |
| 4,720,398 A | 1/1988 | Van Aalten et al. | 427/208 |
| 4,883,712 A | 11/1989 | Ogawa et al. | 428/367 |
| 4,935,297 A | 6/1990 | Yatsumoto | 428/288 |
| 5,075,415 A | 12/1991 | Yotsumoto et al. | 528/149 |
| 5,323,829 A | 6/1994 | Hubbell et al. | 152/527 |
| 5,783,625 A | 7/1998 | Mori et al. | 524/509 |
| 5,861,212 A | 1/1999 | Mori et al. | 428/375 |

FOREIGN PATENT DOCUMENTS

| | | |
|---|---|---|
| GB | 801300 | 12/1955 |
| RU | 740798 | 4/1978 |

OTHER PUBLICATIONS

Hoffman, Werner, "Rubber Technology Handbook", Hanser Publishers, Munich, Vienna and New York, 1989, pp. 294–301.
Chemical Abstracts, vol. 93, No. 14, Abstract No. 133684, XP002104054, 1993.
Chemical Abstracts, vol. 88, No. 22, Abstract No. 154086, XP002104055, 1988.
Abstract for DE3644244, Jun. 1987.
Abstract for JP62090377, Apr. 1987.
Abstract for JP57133041, Aug. 1982.
Abstract for JP52144454, Dec. 1977.
Abstract for GB1486746, Sep. 1977.
Abstract for JP58109684, Jun. 1983.
Abstract for JP63006165, Jan. 1988.
Abstract for DE3642930, Jun. 1987.
Abstract for JP60181369, Sep. 1985.
Abstract for JP59021787, Feb. 1984.

*Primary Examiner*—Erma Cameron
(74) *Attorney, Agent, or Firm*—Bruce J. Hendricks

(57) ABSTRACT

A coated multi-filament reinforcing carbon yarn is encapsulated with a rubber composition. The rubber composition comprises resorcinol-formaldehyde reaction product, a vinylpyridine-styrene butadiene terpolymer, an acrylonitrile-butadiene copolymer and urea.

17 Claims, No Drawings

COATED MULTI-FILAMENT REINFORCING CARBON YARN

This is a Divisional of application Ser. No. 08/695,050, filed on Aug. 9, 1996, now U.S. Pat. No. 6,077,066.

BACKGROUND OF THE INVENTION

Reinforcing yarns of polyester, nylon and steel have been used in tires. While these materials have been overall successful in the past, recent demands in the tire industry have pushed the expected performance into new levels. To meet this demand, it has been contemplated to use multi-filament reinforcing carbon yarn to reinforce the tire. Unfortunately, the degree of adhesion between the yarn and its rubber environment have not been satisfactory. Therefore, any improvement in the adhesion between a carbon yarn and its rubber environment will permit those in the tire industry to meet the expected performance requirements.

SUMMARY OF THE INVENTION

The present invention relates to a coated multi-filament reinforcing carbon yarn. The yarn is encapsulated with a rubber composition containing a resorcinol-formaldehyde reaction product, vinylpyridine-styrene butadiene terpolymer, an acrylonitrile-butadiene copolymer and urea.

DETAILED DESCRIPTION OF THE INVENTION

There is disclosed a coated multi-filament reinforcing carbon yarn encapsulated by a rubber composition, wherein said rubber composition comprises, based on a dry weight basis, (a) from 7 to 12 percent by weight of resorcinol;

(b) from 2.0 to 3.0 percent by weight of formaldehyde, wherein the weight ratio of resorcinol to formaldehyde ranges from 2:1 to 7:1;

(c) from 20 to 60 percent by weight of a vinylpyridine-styrene butadiene terpolymer;

(d) from 20 to 60 percent by weight of an acrylonitrile-butadiene copolymer;

wherein the total percent by weight of vinylpyridine-styrene butadiene terpolymer and acrylonitrile-butadiene copolymer ranges from about 50 percent by weight to 90 percent by weight; and (e) from 2.5 to 6 percent by weight of urea.

In addition, there is disclosed a method for manufacture of a carbon multi-filament reinforcing yarn encapsulated by a rubber composition comprising impregnating a multi-filament carbon yarn with a resorcinol-formaldehyde latex having a solids content ranging from 10 to 40 percent by weight and comprising on a dry weight basis;

(a) from 7 to 12 percent by weight of resorcinol;

(b) from 2.0 to 3.0 percent by weight of formaldehyde, wherein the weight ratio of resorcinol to formaldehyde ranges from 2:1 to 7:1;

(c) from 20 to 60 percent by weight of a vinylpyridine-styrene-butadiene terpolymer;

(d) from 20 to 60 percent by weight of an acrylonitrile-butadiene copolymer; wherein the total percent by weight of vinylpyridine-styrene-butadiene terpolymer and acrylonitrile-butadiene copolymer ranges from 50 percent by weight to 90 percent by weight; and (e) from 2.5 to 6 percent by weight of urea.

The carbon filaments which can be used in the present invention include both carbon filaments having a high carbon content and carbonaceous fibers having a relatively low carbon content. Usually, such carbon filaments have a carbon content of at least 70 percent by weight.

The carbon filaments bundle which can be used in the present invention can be prepared by known processes, such as the process disclosed in U.S. Pat. No. 4,069,297. For example, the carbon filaments bundle can be prepared by oxidizing known polymer filaments comprising mainly polyacrylonitrile (acrylic fiber) in an oxidizing atmosphere (e.g., air) at a temperature of from 200° to 300° C. for a period of from 0.1 to 100 minutes, and then carbonizing the oxidized filaments in an inert gas atmosphere (e.g., $N_2$, argon or helium) at a temperature of from 600° to 3,000° C.

The carbon filaments bundle may also be prepared by forming filaments from a pitch of petroleum or coal, rendering the filaments infusible and carbonizing the infusible filaments in an inert gas atmosphere (e.g., nitrogen, argon, helium, etc) at a temperature of from 600° to 3,000° C.

The bundle to be used usually comprises from 100 to 100,000 filaments each having a cross-section area of from $2 \times 10^{-4}$ to $5 \times 10^{-6}$ mm$^2$. The carbon filaments bundle (also referred to herein as yarn) preferably has a specific resistivity of from $10^3$ to $10^{-4}$ Ωcm, a tensile strength of not less than 100 kgf/mm$^2$, a modulus of elasticity of not less than $10 \times 10^3$ kgf/mm$^2$ and tensile ductility of at least 1.7. The bundle of yarn has a total denier in the range of from 1,000 to 10,000. Preferably, the denier of the yarn ranges from 2,000 to 8,000. The denier per filament in the yarn ranges from 0.5 to 1.5. Preferably, the denier per filament ranges from 0.55 to 1.0.

The overall process of preparing the coated multi-filament reinforcing yarn involves (1) impregnating the multi-filament reinforcing carbon yarn with a liquid medium containing an epoxy resin, (2) adjusting the amount of pickup of the liquid so that, upon subsequently being dried, the amount by weight of the epoxy resin encapsulating the multi-filament yarn ranges from 0.5 percent to 2.5 percent by weight of the yarn, (3) drying the multi-filament yarn to encapsulate the yarn within the epoxy resin, (4) impregnating the yarn encapsulated with the epoxy resin with a liquid medium containing a resorcinol formaldehyde-latex, (5) adjusting the amount of pickup of the liquid so that, after subsequently being dried, the amount by weight of the resorcinol-formaldehyde latex encapsulating the multi-filament yarn ranges from 5 to 35 percent by weight of the yarn and (6) drying the multi-filament yarn to encapsulate it with solidified resorcinol-formaldehyde-latex composition.

The treatment of the original yarn with the epoxy resin before impregnation with the RFL composition is effective for increasing the adhesion of the coated yarn to rubber. The weight of the epoxy resin coating the multi-filament yarn should be limited to the range of from about 0.5 to 2.5 percent by weight of the multi-filament yarn. The weight of the epoxy resin coating the multi-filament yarn is preferably in the range of from about 1 percent to 1.5 percent by weight of the multi-filament yarn.

The weight of the epoxy resin and RFL encapsulating the multi-filament carbon yarn is determined by the difference between the total weight of the coated yarn and the weight of the yarn just prior to coating.

Epoxy resins suitable for use in this invention are compounds having at least one epoxy group; for example, an alkali-treated reaction product of a polyhydroxy alcohol or polyhydroxy phenol and an epichlorohydrin. The polyhydroxy alcohol is preferably glycerin, ethylene glycol, diethylene glycol, propylene glycol, butylene glycol, polyvinyl alcohol, inositol, trimethylol propane or 1,4-dimethylol benzene. As the polyhydroxy phenol, is it preferably resorcinol, hydroquinone, bisphenol A, phloroglucinol or catechol. The liquid containing the epoxy resin in this invention is prepared by dissolving or emulsifying the epoxy resin in water or an organic solvent. The water-soluble epoxy resin suitable for use in this invention is, for example, a reaction product obtained from the reaction of epichlorohydrin and at least one kind of polyol; for example, glycerin, ethylene glycol, polyethylene glycol, propylene glycol polypropylene glycol, neopentyl glycol, trimethylol propane, pentaerythritol, diglycerin or sorbitol. A polyglycidyl ether or diglycidyl ether of glycerin is most preferable.

The drying conditions for the multi-filament yarn impregnated with the liquid containing the epoxy resin depends on the kind of epoxy resin applied but, in general, a milder condition should be adopted than the known condition of the treatment of polyester fiber-coated with a liquid containing epoxy resin. For example, it is preferable to control the drying to a temperature at most about 200° C., most preferably in the range of from about 100° C. to 180° C. When using a water-soluble epoxy resin, it is preferred that the concentration of the epoxy in the liquid is in the range of about 1 percent to 30 percent by weight of the liquid.

The treatment of the yarn encapsulated with the epoxy resin with a resorcinol-formaldehyde-latex (RFL) is effective for increasing the adhesion of the coated yarn to rubber. The weight of the rubber composition coating the multi-filament yarn should range from about 5 to 35 percent by weight of the multi-filament yarn. Depending on whether the yarn is twisted then encapsulated or encapsulated and then dipped, the preferred ranges vary. For example, if the yarn is first twisted, the amount of rubber composition is preferably from 7 to 11 percent by weight. Whereas, if the yarn is first encapsulated and then twisted, the amount of rubber composition is preferably from 15 to 30 percent by weight.

The coated multi-filament reinforcing carbon yarns encapsulated with a rubber composition are prepared by impregnating the yarns with an RFL having a solids content of from 10 to 40 percent by weight. Preferably, the solids content ranges from 25 to 30 percent by weight.

The RFL used in the present invention contains specified weight percentages of resorcinol, formaldehyde, two latices and urea. The weight percentages described for the ingredients of the RFL are on a dry weight basis. The RFL contains from 5 to 20 percent by weight of resorcinol. Preferably, the RFL contains from 7 to 12 percent by weight of resorcinol. The RFL contains from 0.7 to 6.0 percent by weight of formaldehyde. Preferably, the amount of formaldehyde ranges from 2.0 to 3.0 percent by weight. Although the relative amounts of resorcinol and formaldehyde have been separately described, it is contemplated herein that prereacted resins of resorcinol and formaldehyde can be used so long as these overall ranges and ratios of resorcinol and formaldehyde are observed.

The rubber composition contains from 20 to 60 percent by weight of a vinylpyridine-styrene butadiene terpolymer. Preferably, from 35 to 45 percent by weight of the rubber composition is a vinyl pyridine-styrene butadiene terpolymer. The Mooney viscosity of the vinylpyridine-styrene butadiene terpolymer latex ranges form 30 to 90. Within this range, the Mooney viscosity does not appear to be critical. The level of bound vinylpyridine styrene butadiene terpolymer ranges from 5 to 20 percent by weight of the terpolymer. The terpolymer is generally added to the RFL in latex form. The percent solids of the vinylpyridine ranges from about 35 to 45 percent by weight.

The rubber composition also contains from 20 to 60 percent by weight of an acrylonitrile-butadiene copolymer (NER). Preferably, from 35 to 45 percent by weight of the rubber composition is an acrylonitrile-butadiene copolymer. The Mooney viscosity of the acrylonitrile butadiene may range from 90 to 200. The acrylonitrile-butadiene copolymer is generally added to the RFL in latex form. The percent solids of the NBR latex ranges from 30 to 50 percent by weight. The level of bound acrylonitrile in the acrylonitrile-butadiene copolymer may vary. For example, the level of bound acrylonitrile may range from 30 to 60 percent by weight of acrylonitrile-butadiene polymer. Preferably, the level of bound acrylonitrile ranges from 40 to 50 percent by weight.

The rubber composition contains from 2.5 to 6.0 percent by weight of urea on a dry weight basis. Preferably, from 3.0 to 5.0 percent by weight of urea is used.

The rubber composition may contain a number of conventional additives. For example, the RFL may contain a nonionic surfactant to reduce wetability. Representative nonionic surfactants include acetylenic diols, polyalkylene oxides and cellulose ethers. The nonionic surfactant is generally present in an amount ranging from 0.1 to 3.0 percent by weight (on an aqueous basis). Preferably, the nonionic surfactant is present in an amount ranging from 0.5 to 1.0 percent by weight. The RFL may also contain a wax as a processing aid. Representative waxes include natural waxes, petroleum hydrocarbon waxes and fatty acid derivatives such as alcohols, esters and amides. The wax is generally present in an amount ranging from 0.1 to 10 percent by weight. Preferably, the amount of wax is present in an amount ranging from about 1 to 5 percent by weight. The RFL may also contain a monovalent fatty acid salt to reduce surface tension of the latex. Typical salts include the potassium, sodium and ammonium salts of fatty acids such as stearic acid, oleic acid and linoleic acid. An additional example of such salts are the sodium salt of lauroyl sarcosine. The fatty acid salt is generally present in the rubber composition in an amount ranging from about 0.1 to 5.0 percent by weight. Preferably, from 0.2 to 3.0 percent by weight is used.

Other conventional additives such as oil-based or synthetic defoamers and gum or acrylate thickeners may be added as appropriate to achieve desired processing properties.

The coated filament-reinforcing carbon yarn may be twisted or non-twisted. In those instances when a twisted yarn is desired, the yarn may be twisted before or after the yarn is encapsulated with the RFL. If twisted, the twist of the yarn should range from 10 to 100 turns per meter. Preferably, the twist ranges from 30 to 70 turns per meter.

The yarn of the present invention is suitable for use in reinforcing a number of rubber articles. Such articles include tires, belts and hoses. Preferably, such yarn are used in tire and, in particular, in the belt of a wire.

The following examples are presented for the purpose of illustrating the present invention. All parts are parts by weight unless specified otherwise.

EXAMPLE 1

Conventional RFL vs Present Invention

An adhesive was prepared by dissolving resorcinol, 37 percent aqueous formaldehyde and 10 percent aqueous sodium hydroxide in a water solution and adding the solution to a blend of acrylonitrile-butadiene latex (NBR) with vinylpyridine-styrene butadiene terpolymer latex (PSBR) according to the following formulation:

| | |
|---|---|
| Resorcinol | 50.4 g |
| Water | 425.6 g |
| 37% Formaldehyde | 44.7 g |
| 10% NaOH | 50.7 g |
| NBR[1] latex | 245 g |
| PSBR[2] latex | 245 g |

[1]The NBR latex was commercially obtained from The BFGoodrich Company under the designation Hycar® 1561. Hycar® 1561 has a solids content of 41 percent by weight, a Mooney viscosity in the range of from 10.0 to 150 and a level of bound acrylonitrile ranging from 40 to 50 percent by weight.
[2]The vinylpyridine-styrene butadiene terpolymer latex was commercially obtained from the Goodyear Tire & Rubber Company under the designation Pliocord® 4668B. Pliocord® 4668B has a solids content of 42 percent, a Mooney viscosity in the range of from 32 to 48 and a level of bound vinylpyridine of 15 percent by weight.

A second adhesive was prepared from a pre-reacted resorcinol formaldehyde resin, 37 percent aqueous formaldehyde (formalin) and 10 percent NaOH by adding the resin solution to a blend of NBR[1] latex, VSBR latex, non-ionic surfactants, potassium stearate and urea in water as follows:

| | |
|---|---|
| Penacolite[3] R50 | 200 g |
| 10% NaOH | 13 g |
| Water | 316 g |
| 37% Formaldehyde | 16 g |
| NBR[1] latex | 862 g |
| PSBR[2] latex | 862 g |
| Water | 1145 g |
| Surfynol SE[4] | 8 g |
| Hamposyl L30[5] | 7 g |
| Potassium Stearate | 36 g |
| Urea | 36 g |

[3]The pre-reacted resorcinol-formaldehyde resin was commercially obtained from Indspec Chemicals. The amount of resin used is equivalent to addition of 87.3 g resorcinol and 31.7 g or 37 percent aqueous formaldehyde.
[4]The nonionic surfactant was commercially obtained from Air Products of Allentown, Pennsylvania. The surfactant is known as an acetylenic diol.
[5]The anionic surfactant was commercially obtained from Hampshire Chemical Corporation of Lexington, Massachusetts. The surfactant is known as the sodium salt of lauroyl sarcosine.

Each adhesive was allowed to age at room temperature for 24 hours before use. A carbon fiber yarn (Toho Besfight® G30–500 6K HTA-7C with EP01 finish) was immersed in RFL latex for 30 seconds and then heated in a 177° C. oven for 3 minutes to dry and cure the rubber adhesive composition. The coated yarn was then cured into a natural rubber tire belt compound in a modified I test configuration in which a single yarn of a set length was cured in the center of a rubber block aligned with the long axis of the block. The rubber composite was then pulled on an Instron test device in the direction of the long axis. A reference block with no embedded cord was pulled in the same manner. Complete debounding of the fiber was indicated by a sudden drop in the force required to pull the sample. The difference in overall energy between the fiber loaded and included samples was used to calculate the energy of adhesion. Yarn dipped in the first adhesive exhibited 2.0 J energy to debond while yarn dipped in the second adhesive (present invention) exhibited 2.9 J energy.

EXAMPLE 2

Resorcinol to Formaldehyde Ratio

Two adhesives were prepared similar to the second adhesive in Example 1 except that, in one, the amount of formaldehyde was increased from 16 g to 27 g (weight ratio of resorcinol to formaldehyde of 49:1 and 2.2:1). The adhesives were aged 24 hours before use. The epoxy encapsulated carbon fiber yarn described in Example 1 was passed through the adhesive at 13 meters per minute (14 ypm) and then passed through ovens heated to 120° C. and 177° C. such that the exposure time in each oven was 60 seconds. The rubber encapsulated yarn was then twisted on a Saco Lowell ring twister to a twist of 60 turns per meter. The cord was then drum wound onto a natural rubber belt compound and covered with a second layer of the same compound. The rubber-coated fiber was used to prepare a two-ply composite, cured in a heated press and peeled in a test chamber conditioned to 120° C. Adhesion was measured by the force required to peel the two plies apart. Peel force was 147 N for the adhesive with the higher level of formaldehyde and 162 N for the adhesive with the lower level. Dip pickup of the yarn was 21.9 and 18.9 percent, respectively.

EXAMPLE 3

An adhesive was prepared according to the methods described above of the following formulation:

| | |
|---|---|
| Penacolite[6] 2200 | 40.7 g |
| 10% NaOH | 3.7 g |
| Water | 106.6 g |
| 37% Formaldehyde | 4.6 g |
| NBR[1] latex | 246.0 g |
| PSBR[7] latex | 252.0 g |
| Water | 279.9 |
| Surfynol SE[4] | 2.3 g |
| 20% aqueous potassium stearate | 30.0 g |
| Urea | 10.3 g |
| Acrawax[8] C dispersion | 24.8 g |

Twisted Yarn Dipping

The adhesive was aged 24 hours, then used to coat carbon fiber yarn which had been twisted at 60 turns per meter prior to application of the adhesive. Peel force for a 2-ply sample was 155 N for a yarn with a dip pickup of 9.0 percent and 125 N for yarn with a dip pickup of 5.8 percent by weight.

EXAMPLE 4

The second adhesive described in Example 1 was modified by the addition of a wax (86.8 grams of Acrawax™ C dispersion), a 33 percent solids aqueous dispersion of ethylene bis-stearamide commercially obtained from Lonza Inc. The two adhesives were aged 24 hours, then used to coat carbon fiber yarn as in Example 2. Test samples were prepared in the same manner. Peel force was 160 N for the sample without the wax and 175 N for the sample containing the wax. Dip pickup with the wax was 27.0 percent versus 18.9 percent without the wax.

What is claimed is:

1. A method of manufacture of a carbon multi-filament reinforcing yarn encapsulated by a rubber composition comprising impregnating a multi-filament carbon yarn with a resorcinol-formaldehyde latex having a solids content ranging from 10 to 40 percent by weight and comprising on a dry weight basis
    (a) from 7 to 12 percent by weight of resorcinol;
    (b) from 2.0 to 3.0 percent by weight of formaldehyde, and the weight ratio of resorcinol to formaldehyde ranges from 2:1 to 7:1;
    (c) from 20 to 60 percent by weight of a vinylpyridine-styrene-butadiene terpolymer latex;

(d) from 20 to 60 percent by weight of an acrylonitrile-butadiene copolymer; wherein the total percent by weight of vinylpyridine-styrene-butadiene terpolymer and acrylonitrile-butadiene copolymer ranges from 50 percent by weight to 90 percent by weight of the liquid medium in the latex; and (e) from 2.5 to 6 percent by weight of urea.

2. The method of claim 1 wherein the amount of pick-up of the latex is adjusted so that, after subsequently being dried, the amount of weight of the rubber composition encapsulating the multi-filament yarn ranges from 5 to 35 percent by weight of the multi-filament yarn.

3. The method of claim 2 wherein the carbon multi-filament reinforcing yarn impregnated with said latex is dried.

4. The method of claim 1 in which prior to being subjected to said impregnation of the resorcinol-formaldehyde latex, the multi-filament carbon yarn is subjected to the following steps:

(a) impregnating the yarn with a liquid medium containing an epoxy resin;

(b) adjusting the amount of pick-up of the liquid so that, after subsequently being dried, the amount by weight of the epoxy resin encapsulating the yarn ranges from 0.5 to 2.5 percent by weight of the yarn; and (c) drying the yarn to encapsulate the yarn with the epoxy resin.

5. The method of claim 1 wherein the rubber composition contains, on a dry basis, 0.1 to 3.0 percent by weight of a nonionic surfactant.

6. The method of claim 1 wherein the rubber composition contains, on a dry basis, 0.1 to 10 percent by weight of a wax.

7. The method of claim 1 wherein the rubber composition contains, on a dry basis, 0.1 to 5.0 percent by weight of a fatty acid salt.

8. The method of claim 1 wherein the Mooney viscosity of the vinylpyridine-styrene-butadiene terpolymer is from 30 to 90.

9. The method of claim 1 wherein the level of vinylpyridine ranges from 5 to 20 percent by weight of the terpolymer.

10. The method of claim 1 wherein the multi-filament yarn is encapsulated by an epoxy resin before impregnation with the resorcinol-formaldehyde latex.

11. The method of claim 10 wherein the amount of dried epoxy resin encapsulating the multi-filament yarn ranges from 0.5 to 2.5 percent by weight of the multi-filament yarn.

12. The method of claim 1 wherein said yarn has a total denier in the range of from 1000 to 10,000 denier.

13. The method of claim 1 wherein the denier per filament in said yarn ranges from 0.5 to 1.5.

14. The method of claim 1 wherein the number of filaments in said yarn ranges from 3,000 to 12,000.

15. The method of claim 1 wherein said yarn is twisted.

16. The method of claim 15 wherein said yarn is twisted before the yarn is encapsulated with the resorcinol-formaldehyde latex.

17. The method of claim 15 wherein said yarn is twisted after the yarn is encapsulated with the resorcinol-formaldehyde latex.

* * * * *